Nov. 17, 1942.                H. T. BUDENBOM                2,301,929
             RADIO DISTANCE AND ALTITUDE INDICATING SYSTEM
                        Original Filed June 20, 1940
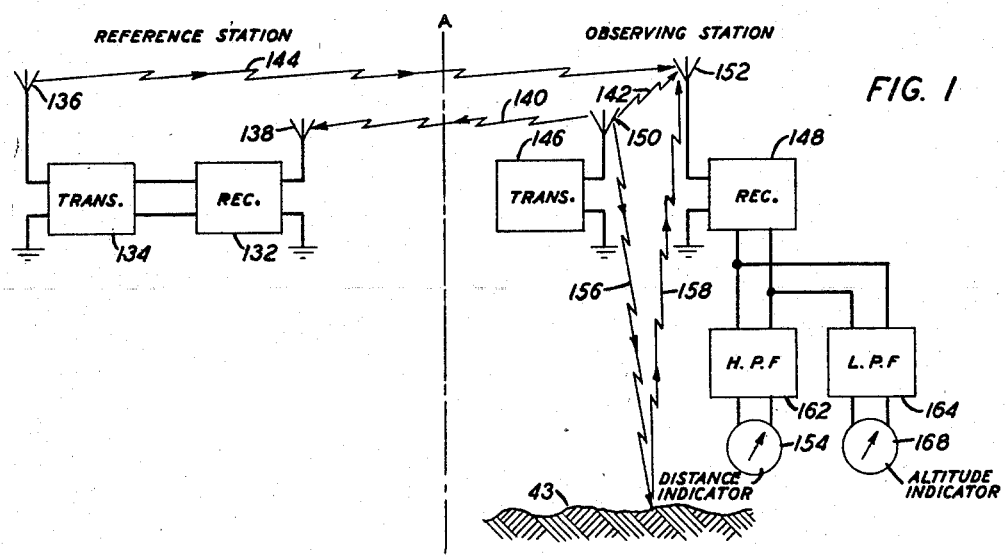
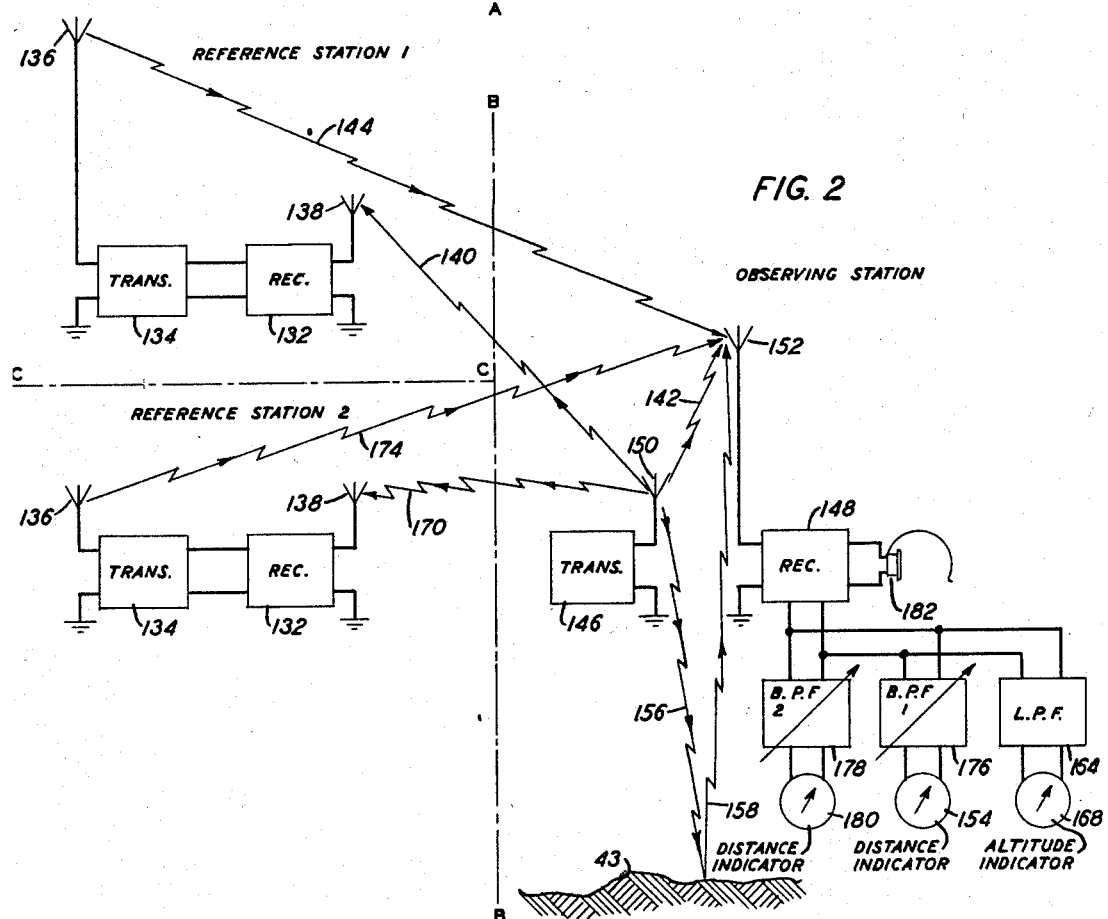
INVENTOR
H.T. BUDENBOM
BY
ATTORNEY Patented Nov. 17, 1942

2,301,929

UNITED STATES PATENT OFFICE 2,301,929

RADIO DISTANCE AND ALTITUDE INDICATING SYSTEM

Horace T. Budenbom, Short Hills, N. J., assignor to Bell Telephone Laboratories, Incorporated, New York, N. Y., a corporation of New York Original application June 20, 1940, Serial No. 341,517. Divided and this application April 18, 1941, Serial No. 389,135

3 Claims. (Cl. 250—1)

This invention relates to radio distance and altitude indicating systems and methods.

More specifically, it relates to systems and methods for obtaining simultaneous distance and altitude indications from beat-notes obtained by the combination of several components of frequency modulated waves, including reflected wave components some or all of which have been actively reflected.

This application is a division of my application Serial No. 341,517, filed June 20, 1940 which issued July 8, 1941, as Patent 2,248,215.

One method of distance determination employed in systems of the invention comprises radiating from a mobile craft a frequency modulated wave, receiving the wave at one or more fixed reference points and retransmitting it to the craft, combining the received retransmitted waves at the craft with the wave being instantly radiated to provide beat-notes, the frequencies of which are functions of the respective distances travelled by the reflected components of the wave. The method represents an extension of the principles of the altimeter system of Patents 2,045,071 and 2,045,072, both issued June 23, 1936 to L. Espenschied. The same frequency modulated wave can, obviously, be employed to obtain altitude indications simultaneously in cases where the mobile craft bearing the transmitting station is an aircraft. Appropriate means for segregating the significant beat-notes are, of course, provided. One or more distance indicating meters, calibrated to compensate for the delay inherent in the apparatus at the one or more fixed reference stations, respectively, of the system are likewise provided. As applied to aircraft, navigational systems of the invention are particularly advantageous since by employing active reflecting stations for distance determination, a relatively low-power short-range reflection-type altimeter system such as is normally carried on modern aircraft will be adequate and except for the addition of a small number of filters and meters, which can be made compactly and of light weight, the aircraft need not carry any additional bulk or weight of apparatus.

Numerous combinations of systems of the present application with systems described in my above-mentioned copending application can readily be devised by those skilled in the art. A few such systems are described in my copending application.

By obtaining several distance indications from known fixed reference points, the position of the craft may, of course, be readily determined and, by obtaining a series of positions from time to time, the course being followed by the craft can be charted, and the progress or speed of the craft estimated.

Accordingly, objects of the invention are to provide distance, position, course and altitude indications for mobile aircraft.

A further object is to provide simultaneous indications of the distance of a mobile craft from several known, fixed, reference stations.

Another object is to provide, simultaneously, distance indications with reference to one or more known, fixed, reference points and an altitude indication with respect to the surface of the earth immediately beneath the aircraft.

Other objects will become apparent during the course of the following description of illustrative embodiments of the invention and from the appended claims.

The principles of the invention will be more readily understood from the following description and the accompanying drawing in which:

Fig. 1 shows in diagrammatic form a system employing a frequency modulated wave to obtain simultaneous distance and altitude indications; and Fig. 2 shows in diagrammatic form a system of the invention employing a frequency modulated wave arranged to provide simultaneous indications of distance from two fixed reference stations and of altitude above the earth's surface.

In more detail, in Fig. 1 a transmitter 146 is located at the observing station, i. e., upon a mobile craft. Transmitter 146 energizes antenna 150 with a frequency modulated wave such, for example, as is employed in the altimeter of United States Patent 2,045,072 to Espenschied, mentioned above.

The wave radiated via component 140 is received at the reference station on antenna 138, amplified in receiver 132 and retransmitted by transmitter 134 from antenna 136, via component 144 to antenna 152 at the observing station.

Antenna 152 is also arranged so as to receive a relatively small amount of energy, i. e., component 142 directly from antenna 150.

Components 142 and 144 are combined and detected in receiver 148 and the resultant beat-note frequency is caused to actuate a frequency indicator 154 which may be calibrated to read distance directly.

The system is obviously analogous to the altimeter of Espenschied's above-noted patent, except that a relaying or reference station located at a point of known location is employed to actively "reflect" the wave back to the observing station in the place of obtaining reflection from a passive reflecting surface.

Obviously, in order to reduce difficulties at the reference station from "singing" or "regeneration," etc., the receiving antenna 138 may be shielded from direct transmission from transmitting antenna 136 or, alternatively, a carrier of fixed frequency, modulated by a frequency modulated wave can be employed in place of a simple frequency modulated carrier and the retransmission from the reference station may be by means of a different fixed carrier wave modulated by the frequency modulated wave derived by detecting the modulated carrier received in receiver 132.

Also, where the observing system of Fig. 1 is on an aircraft, part of the frequency modulated wave 156 may be directed toward the earth 43 beneath the craft and reflections thereof 158 received from the earth and combined with the instantly radiated wave 142 to obtain a beat-note, the frequency of which is indicative of the altitude of the craft as taught by Espenschied, supra. In general, the distance to the reference station will be very much greater than the altitude and the beat frequency indicative of distance thereto will, therefore, be much higher than that indicating altitude so that appropriate filters, such, for example, as a low-pass filter 164 and a high-pass filter 162, may be employed to separate the two beat frequencies, whereby the output of one filter may actuate a meter showing altitude and the output of the other filter may actuate a distance indicator as shown in Fig. 1. Delay inherent in the receiving and retransmitting apparatus and associated circuits of the reference station will, obviously, increase the separation in frequency between the beat-notes indicating altitude and those indicating distance. As such inherent delay is substantially constant the distance indicating portion of the system can, of course, be calibrated to take it into account. Likewise the constant delay in the apparatus or circuits of the reference station may, obviously, be readily increased, by means well known in the art, so that the beat-notes employed for distance determination are suitably separated in frequency from those employed for altitude determination even if it should be desired under special circumstances to measure distances of the same order of magnitude as the altitude.

As stated above, however, in general, the distance to the reference station will be very much greater than the altitude and an important feature of the invention is that, as is mentioned above, it permits an aircraft equipped with a standard short-range reflection-type altitude indicating system to obtain long-range distance indications with respect to one or more remotely located fixed reference points without substantially increasing the amount and weight of the apparatus which must be carried on the aircraft. With accurate long-range distance indications from several remote points available the craft may, obviously, determine its position to a high degree of accuracy and from topographical maps of the area a safe flying altitude can be determined for each locality in which the craft may find itself. The practical importance of such an arrangement both from the standpoint of the value of the information provided and from that of the small addition to the weight which must be carried aboard the craft, is, obviously, extremely large.

In Fig. 2 another system of the invention is shown diagrammatically which will provide on an aircraft simultaneous and instantaneous indications of the distances to two separate fixed reference stations and altitude above the earth 43. At the observing station, transmitter 146 transmits from antenna 150 a radio wave which is frequency modulated substantially as for the system of Fig. 1. Since two fixed reference stations are employed in Fig. 2, two distance indications, one with respect to each reference station, may be obtained by this arrangement as well as the altitude above the earth. Band-pass filter 176 will pass frequencies within one range but exclude those within a second range and band-pass filter 178 will pass the second range and exclude the first. These band-pass filters are preferably adjustable as to their transmitting ranges to provide adequate flexibility in the use of the system.

To measure altitude, some of the energy radiated by antenna 150, represented by wave 156, is directed toward the ground under the mobile craft and is received after reflection as wave 158, therefrom, by antenna 152 as for the system of Fig. 1. The wave 158 is combined with wave 142 and detected in receiver 148 and the resulting beat-note is selected by low-pass filter 164 to operate altitude indicating meter 168, as for Fig. 1. The identity of the reference stations being received may be established by any of numerous well-known methods, such, for example, as by consecutively imposing upon their transmitted waves distinctive tone modulations at suitable intervals and detecting and observing the tones in headphones 182.

The above-described arrangements are illustrative of a variety of combinations of apparatus which may readily be devised as embodiments of the principles of the invention by those skilled in the art. No attempt has been here made to exhaustively cover such applications. The scope of the invention is defined in the following claims.

What is claimed is:

1. In a navigational system for aircraft, a short-range high-frequency wave-reflection altimeter mounted on an aircraft, said altimeter being of the type which transmits frequency modulated waves and combines the received reflected waves from the earth's surface beneath the craft with the instantly transmitted waves to obtain beat-notes the frequency of which is indicative of altitude, a reference station located at a definitely known remote fixed point on the earth's surface, a radio receiving apparatus at said reference station capable of receiving the frequency modulated waves emitted by the altimeter on said aircraft, a radio transmitting apparatus at said reference station cooperatively connected with the said receiving apparatus at said station to retransmit the frequency modulated waves received by the receiving apparatus with sufficient power to be readily received by the altimeter receiver on said aircraft, filters on said aircraft cooperatively connected with the altimeter receiver to segregate the relatively low-frequency beat-notes indicative of altitude and the relatively high-frequency beat-notes resulting from the combination in the altimeter receiver of the retransmitted waves from said reference station with the instantly transmitted waves, a first meter connected with the filter segregating the relatively low-frequency beat-notes and responsive thereto to indicate altitude and a second meter connected with the filter segregating the relatively high-frequency beat-notes and responsive thereto to indicate the distance to the remote reference station, whereby the altitude of the aircraft above the earth's surface and the distance of the craft from a definitely known remote fixed point on the earth's surface may be simultaneously determined without substantially increasing the bulk and weight of apparatus required upon the aircraft for the determination of altitude alone by the use of frequency modulated waves.

2. The navigational system of claim 1 and additional reference stations at points remote from said aircraft and from each other, cooperatively associated receiving and retransmitting apparatus at each of said reference stations for receiving the wave emitted by the aircraft altimeter system and retransmitting it back to said aircraft together with a station identification signal, filtering means on said aircraft for separating the beat-note signals resulting from the combination of the retransmitted waves with the instantly transmitted waves and means responsive to said segregated beat-note signals for indicating the respective distances of each of said remote reference stations, whereby the position of said craft may be determined simultaneously with the determination of its altitude and the progress of said aircraft may be followed by successive observations of the navigator thereof, without substantially increasing the amount or weight of apparatus required on said aircraft for the determination of altitude alone by the use of frequency modulated waves.

3. In a navigational system for aircraft a short-range wave-reflection altimeter system mounted on an aircraft, a reference station located at a definitely known remote fixed point on the earth's surface, a receiving apparatus at said reference station capable of receiving the waves emitted by the altimeter system, a transmitting apparatus at said reference station cooperatively connected with the said receiving apparatus at said station to retransmit the waves received by the receiving apparatus with sufficient power to be readily received by the altimeter system on said aircraft, means on said aircraft for severally determining the time interval between the transmission of waves from said aircraft and the receipt of waves from the transmitting station at said reference point and the time interval between the transmission of waves from said aircraft and the receipt of reflections thereof from the surface of the earth beneath the craft whereby long-range distance determinations are obtained simultaneously with short-range altitude determinations without substantially increasing the amount of apparatus, in addition to the altimeter system, which is required on the aircraft.

HORACE T. BUDENBOM.

Disclaimer 2,301,929.—*Horace T. Budenbom*, Short Hills, N. J. RADIO DISTANCE AND ALTITUDE INDICATING SYSTEM. Patent dated Nov. 17, 1942. Disclaimer filed Sept. 21, 1950, by the assignee, *Bell Telephone Laboratories, Incorporated*.

Hereby enters this disclaimer to claims 1 and 3 of said patent.

*Official Gazette October 17, 1950.*